(12) United States Patent
Walker et al.

(10) Patent No.: US 9,010,100 B2
(45) Date of Patent: Apr. 21, 2015

(54) SEAL ASSEMBLY FOR TORQUE CONVERTER

(75) Inventors: Jason R. Walker, Pekin, IL (US); Cody A. McIntyre, Pelican Rapids, MN (US); William M. McClure, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 562 days.

(21) Appl. No.: 13/460,088

(22) Filed: Apr. 30, 2012

(65) Prior Publication Data

US 2013/0283774 A1 Oct. 31, 2013

(51) Int. Cl.
*F16D 33/00* (2006.01)
*F16H 41/24* (2006.01)
*F16D 33/20* (2006.01)

(52) U.S. Cl.
CPC ............... *F16D 33/00* (2013.01); *F16D 33/20* (2013.01); *F16H 41/24* (2013.01)

(58) Field of Classification Search
CPC ......... F16D 33/00; F16D 33/20; F16H 41/24; F16H 41/30
USPC ........................................... 60/330, 366, 339
See application file for complete search history.

(56) References Cited

U.S. PATENT DOCUMENTS

| | | | |
|---|---|---|---|
| 2,630,682 A | 3/1953 | Wemp | |
| 2,764,269 A | 9/1956 | Schjolin | |
| 3,307,430 A | 3/1967 | Bauder | |
| 4,974,715 A | 12/1990 | Koyama | |
| 5,029,685 A | 7/1991 | Takase et al. | |
| 6,145,842 A | 11/2000 | Zellers et al. | |
| 6,564,914 B1 | 5/2003 | Glock et al. | |
| 7,516,612 B2 | 4/2009 | Schoenek | |
| 7,530,868 B2 | 5/2009 | Matsuda et al. | |
| 7,971,694 B2 | 7/2011 | Beattie | |

FOREIGN PATENT DOCUMENTS

| | | |
|---|---|---|
| EP | 1947373 A1 | 7/2008 |
| JP | 09196141 A | 7/1997 |
| WO | WO 90/08273 | 7/1990 |

*Primary Examiner* — F. Daniel Lopez
*Assistant Examiner* — Daniel Collins
(74) *Attorney, Agent, or Firm* — Finnegan, Henderson, Farabow, Garrett & Dunner, LLP

(57) ABSTRACT

A seal assembly includes a seal carrier configured to be coupled to and rotate with a shaft. The seal carrier defines at least three annular recesses configured to receive annular seals. The seal assembly further includes at least three annular seals configured to provide a seal between the seal carrier and a non-rotating housing defining an inner surface having a circular cross-section. One of the at least three seals is received in each of the at least three annular recesses, and one of the at least three seals has a smaller cross-sectional area than a cross-sectional area of at least one of the other seals.

20 Claims, 5 Drawing Sheets

SEAL ASSEMBLY FOR TORQUE CONVERTER

TECHNICAL FIELD

The present disclosure relates to a seal assembly and, more particularly, to a seal assembly for a torque converter.

BACKGROUND

It is often desirable to provide a coupling between the rotating output of a prime mover and the rotating input of a driven load that permits a disparity between the rotational speed of the rotating output of the prime mover and the rotating input of the driven load. For example, in order to permit continuous rotation of the output of the prime mover even when it is desirable to stop rotation of the input of the driven load, it is desirable to provide a coupling that permits the rotational output of the prime mover to continue despite the input of the driven load being stopped.

An example of such a coupling is a torque converter, which provides a hydrodynamic fluid coupling between the rotating output of a prime mover and the rotating input of a driven load. For example, a machine such as a vehicle may include an internal combustion engine and a transmission, with the output of the internal combustion engine coupled to an input of the transmission by the torque converter.

A torque converter generally includes an input coupling for coupling the output of a prime mover to the input of the torque converter, and an output shaft for coupling the output of the torque converter to a driven load, such as a transmission. The torque converter further includes a housing containing fluid, such as hydraulic fluid. Within the housing, the input coupling is coupled to a pump including an impeller for pumping the fluid in the housing. The torque converter further includes a turbine coupled to the output shaft of the torque converter. The impeller of the pump, driven by the input coupling, pumps fluid through the turbine, thereby causing the turbine to rotate and drive the output shaft of the torque converter and the input of, for example, a transmission. By virtue of the fluid coupling provided by the interaction between the impeller and the turbine, the output of the prime mover may continue to rotate the input coupling of the torque converter, even when the output shaft of the torque converter is stopped.

The output shaft of the torque converter extends generally through the center of the impeller and the turbine, which rotate about the longitudinal axis of the output shaft. As a result, it is desirable to provide a fluid seal between the output shaft of the torque converter and the housing of the torque converter to prevent leakage of the fluid from the housing at the interface between the output shaft and the housing. However, such seals are subjected to high levels of stress as a result of rotation of the output shaft relative to the non-rotating portion of the housing. In addition, such seals are subjected to high levels of stress due to high fluid pressure on one side of the seal, resulting from high fluid pressure in the torque converter housing relative to the low pressure on the opposite side of the seal. As a result, such seals may tend to degrade over time, and possibly leak fluid, which is undesirable. Therefore, it may be desirable to develop a seal for a torque converter output shaft that improves the seal at the interface between the output shaft and housing.

One attempt to provide a seal for a torque converter is described in U.S. Pat. No. 6,145,842 to Zellers et al. ("the '842 patent"). The '842 patent discloses a torque converter having a lip seal abutting the torque converter impeller control pump drive hub. The drive hub is rotatably supported in a transmission housing. The '842 patent discloses that oil from the drive hub side of the bushing passes through the bushing into a chamber sealed from atmosphere by the lip seal. The bushing has a control passage for exhausting a portion of the oil from the control pump side prior to reaching the chamber.

Although the lip seal arrangement disclosed in the '842 patent may provide a seal for preventing oil from leaking between the torque converter housing and the impeller control pump drive hub, it may suffer from a number of possible drawbacks. For example, the seal disclosed in the '842 patent does not provide a seal between the torque converter output shaft and the housing of the torque converter. The seal assembly and method disclosed herein may be directed to mitigating or overcoming the possible drawback set forth above.

SUMMARY

In one aspect, the present disclosure includes a seal assembly including a seal carrier configured to be coupled to and rotate with a shaft. The seal carrier defines at least three annular recesses configured to receive annular seals. The seal assembly further includes at least three annular seals configured to provide a seal between the seal carrier and a non-rotating housing defining an inner surface having a circular cross-section. One of the at least three seals is received in each of the at least three annular recesses, and one of the at least three seals has a smaller cross-sectional area than a cross-sectional area of at least one of the other seals.

In another aspect, the present disclosure includes torque converter including a housing configured to be rotated by a prime mover, and an impeller coupled to the housing and configured to rotate with the housing and pump fluid. The torque converter further includes a turbine configured to rotate as a result of fluid pumped by the impeller, and a stator associated with the impeller and the turbine. The stator is configured to direct fluid flow between the turbine and the impeller. The torque converter further includes an output shaft coupled to the turbine and configured to be rotated by the turbine, and a non-rotating housing coupled to the stator and configured to receive the output shaft, wherein the non-rotating housing defines an inner surface having a circular cross-section. The torque converter further includes a seal assembly coupled to the output shaft. The seal assembly includes a seal carrier coupled to and configured to rotate with the output shaft, the seal carrier defining at least first and second annular recesses configured to receive annular seals, and an annular groove between the first and second annular recesses. The seal assembly further includes a first annular seal and a second annular seal configured to provide a seal between the seal carrier and the non-rotating housing, wherein the first and second annular seals are received respectively in the first and second annular recesses. The non-rotating housing defines a fluid passage configured to provide flow communication between the annular groove of the seal carrier and a location exterior with respect to the non-rotating housing, such that the first annular seal is exposed to a lower fluid pressure than the second annular seal, wherein the first annular seal has a smaller cross-sectional area than a cross-sectional area of the second annular seal.

In still a further aspect, the present disclosure includes a method for providing reduced fluid pressure between a seal assembly and a lip seal, wherein the seal assembly is coupled to a shaft configured to rotate within a non-rotating housing. The method includes providing a seal assembly including a seal carrier defining at least three annular recesses having at least three annular seals received respectively therein, wherein the seal carrier is coupled to and rotates with the shaft, and the annular seals provide a seal between the seal carrier and the non-rotating housing. The method includes supplying fluid to the seal assembly at a first pressure to provide lubrication between the annular seals and the seal carrier. The method further includes providing a fluid passage in the non-rotating housing in flow communication with an annular groove between two of the at least three annular seals, such that fluid pressure between the two annular seals is at a second pressure that is less than the first pressure, wherein the lip seal is coupled to the non-rotating housing at a position opposite at least one other annular seal with respect to the two annular seals, and wherein one of the two annular seals has a smaller cross-sectional area than a cross-sectional area of another of the two annular seals.

DETAILED DESCRIPTION

Figure 1:
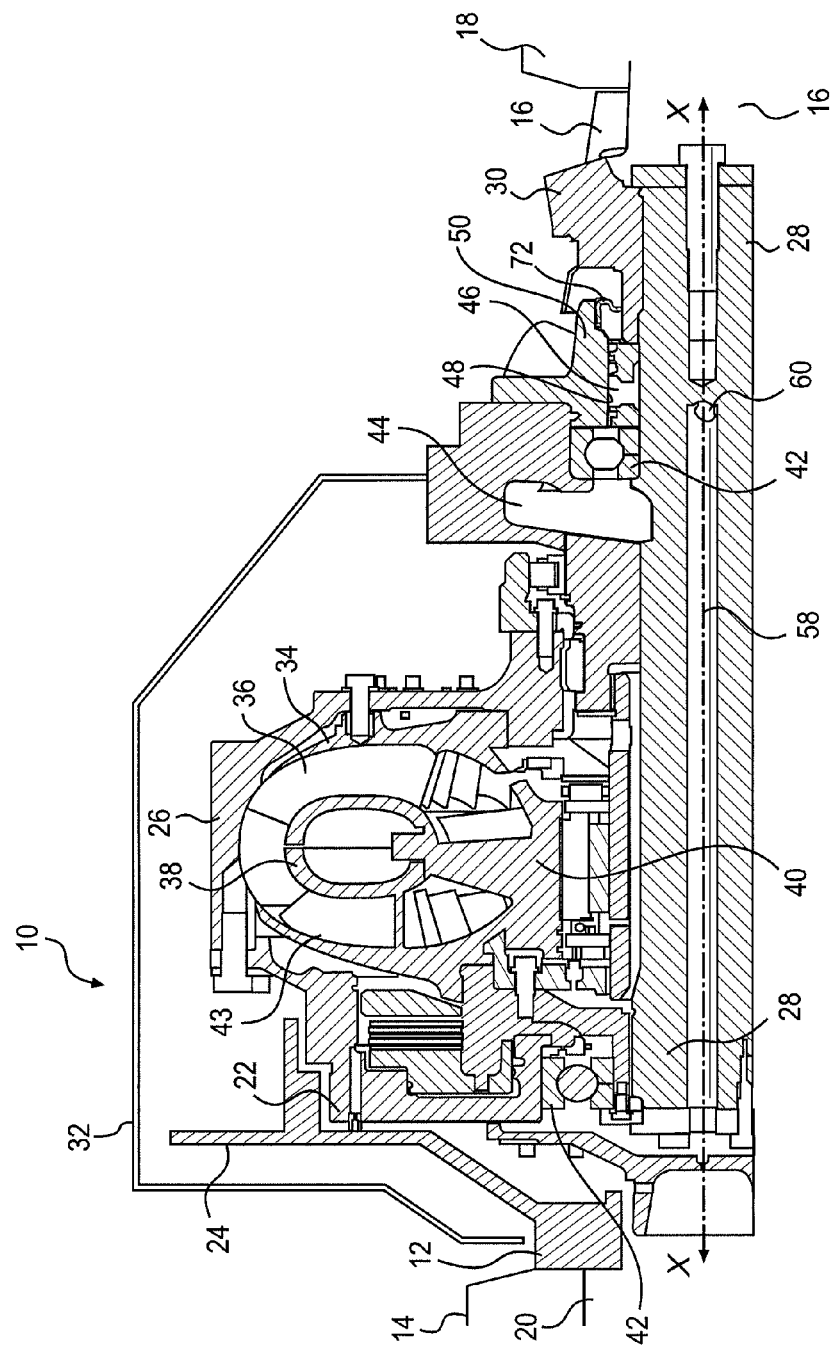
FIG. 1 is a partial section view of an exemplary embodiment of a torque converter.

FIG. 1 is a partial section view of an exemplary embodiment of a torque converter 10 configured to couple an output 12 of a prime mover 14 to an input member 16 of a driven mechanism 18. For example, prime mover 14 may be an internal combustion engine or an electric motor having an output shaft 20 configured to be coupled to an input coupling 22 of exemplary torque converter 10. As shown in FIG. 1, for example, output shaft 20 is coupled to a flywheel 24, which, in turn, is coupled to a rotating housing 26 of exemplary torque converter 10. In the exemplary embodiment shown, flywheel 24, driven by prime mover 14, is coupled to and drives rotating housing 26. Exemplary torque converter 10 includes an output shaft 28 coupled to input member 16 of driven mechanism 18 via an output yoke 30. Driven mechanism 18 may be an input of a machine such as, for example, a transmission of a machine such as a vehicle, pump, compressor, or generator, or any other machine configured to be driven by a prime mover.

In the exemplary embodiment shown in FIG. 1, torque converter 10 includes a housing 32 configured to house the moving parts of torque converter 10, as well as fluid used to provide a fluid coupling between input member 16 and output shaft 28 of torque converter 10. Housing 32 contains rotating housing 26, which is coupled to a pump 34 having an impeller 36 configured to pump fluid within rotating housing 26. Torque converter 10 further includes a turbine 38 opposite impeller 36. Turbine 38 is coupled to output shaft 28, for example, via a splined coupling, such that as turbine 38 rotates, output shaft 28 also rotates. Exemplary torque converter 10 shown in FIG. 1 further includes a stator 40 configured to re-direct fluid exiting turbine 38 back to impeller 36 of pump 34 to improve efficiency. Output shaft 28 rotates about longitudinal axis X on a pair of bearings 42 located at opposite ends of output shaft 28, with bearings 42 being mounted in a fixed manner relative to housing 32 of torque converter 10.

During operation, prime mover 14 rotates flywheel 24, which is coupled to rotating housing 26 of torque converter 10, thereby driving rotating housing 26. Impeller 36 of pump 34, being coupled to rotating housing 26, rotates about longitudinal axis X and pumps fluid through turbine 38. Turbine 38 includes a plurality of vanes 43 configured to rotate turbine 38 about longitudinal axis X as fluid flows through vanes 43. Turbine 38, by virtue of being coupled to output shaft 28 of torque converter 10, drives output shaft 28, which is coupled to driven mechanism 18 by output yoke 30. Thus, the interaction of the fluid being pumped through turbine 38 by impeller 36 provides a hydrodynamic fluid coupling between prime mover 14 and driven mechanism 18.

The hydrodynamic fluid coupling permits output 12 of prime mover 14 to rotate at a different speed than input member 16 of driven mechanism 18. For example, for machines such as vehicles, prime mover 14 may operate at a relatively low speed while input member 16 of the transmission is held in a stopped condition (e.g., by operation of brakes of the vehicle). Pump 34 of torque converter 10 pumps fluid through turbine 38, but by holding input member 16 in a stopped condition, the energy of the pumped fluid can be absorbed by heating of the fluid rather than turning turbine 38. However, if input member is no longer held in a stopped condition, fluid pumped through turbine 38 causes it to rotate, thereby rotating output shaft 28 of torque converter 10. As the speed of output 12 of prime mover 14 is increased, pump 34 of torque converter pumps fluid through turbine 38 at an increasing rate, thereby causing turbine 38 and output shaft 28 to rotate at an increasing rate.

In the exemplary embodiment shown, output shaft 28 rotates about longitudinal axis X on bearings 42. Housing 32 includes a lubricating passage 44 configured to supply the bearing 42 located at the end of output shaft 28 adjacent output yoke 30 of torque converter 10. Lubricant may be provided under pressure to ensure sufficient lubrication and cooling of bearing 42. For example, lubricant may be supplied to bearing 42 at about 70 pounds per square inch.

In order to prevent leakage of lubricant associated with bearing 42, exemplary torque converter 10 includes a seal assembly 46 configured to provide a fluid seal between output shaft 28 and an inner surface 48 of a non-rotating housing 50, which is coupled to housing 32 of torque converter 10. In the exemplary embodiment shown, inner surface 48 of non-rotating housing 50 defines a circular cross-section.

Figure 2A:
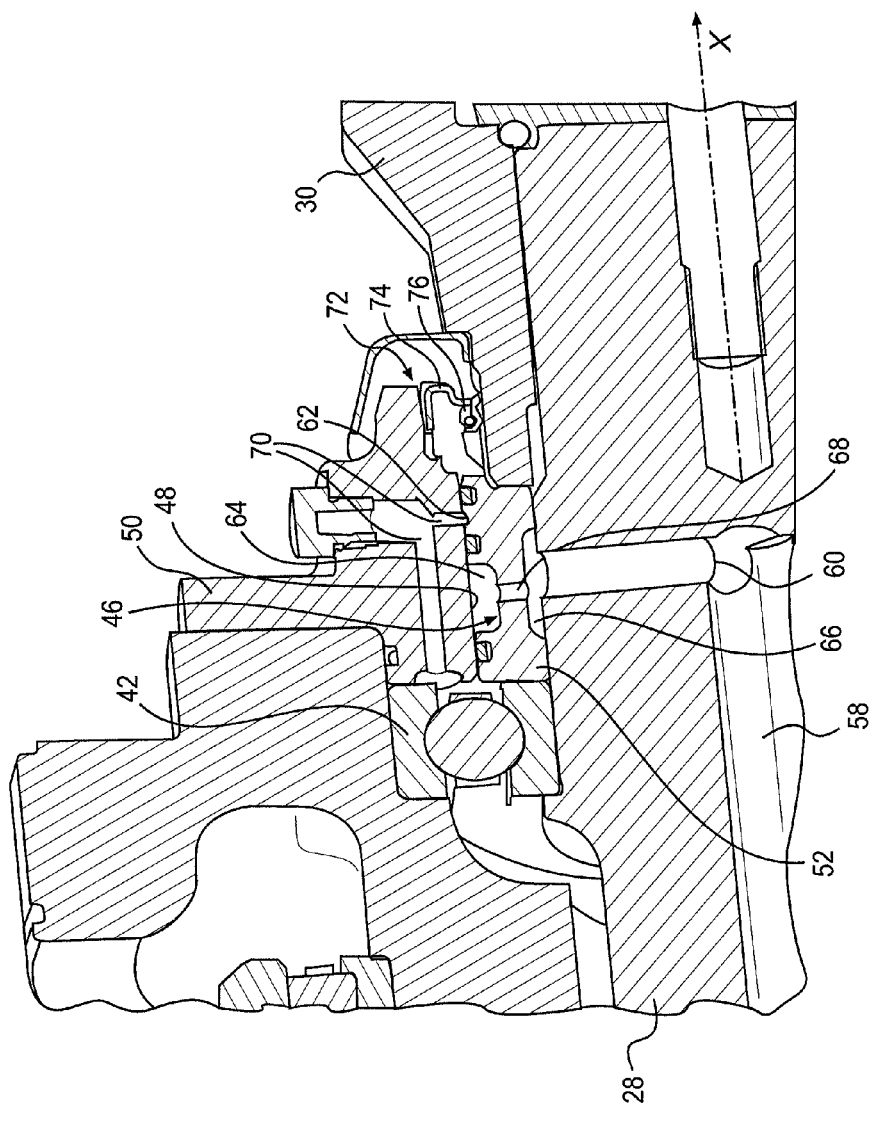
FIG. 2A is a partial perspective section view of a portion of the exemplary torque converter shown in FIG. 1.
Figure 2B:
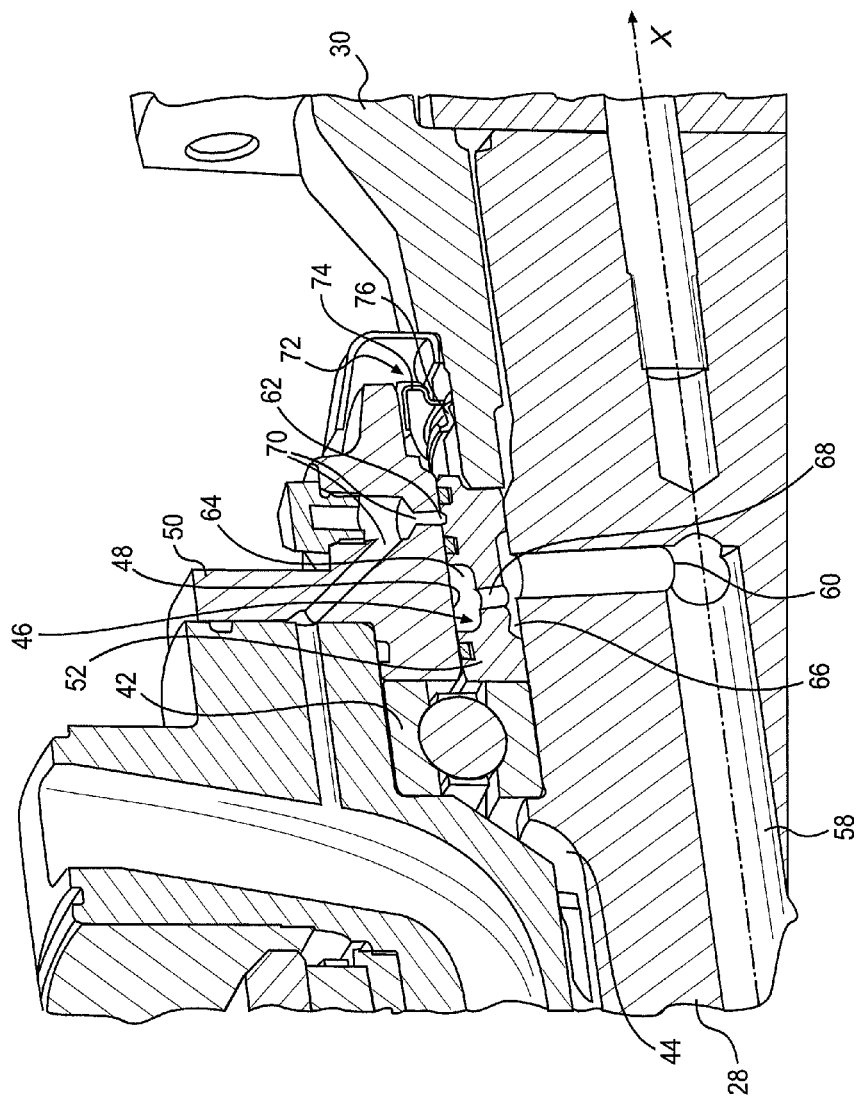
FIG. 2B is a partial perspective section view of a portion of the exemplary torque converter shown in FIG. 2A at a different radial location.
Figure 3:
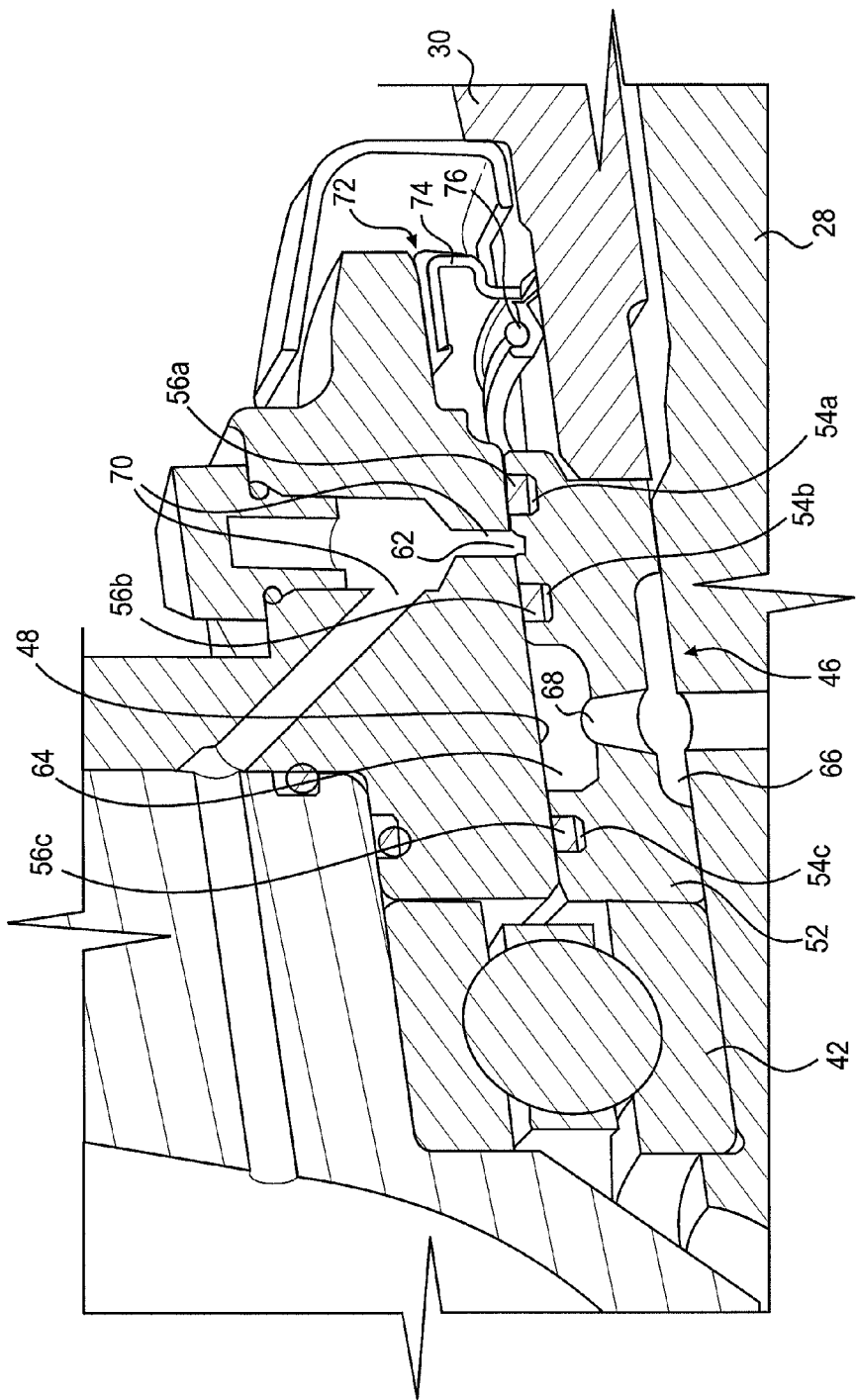
FIG. 3 is a partial section view of a portion of the exemplary embodiment shown in FIG. 2B.

As shown in FIGS. 1, 2A, and 2B, exemplary seal assembly 46 is positioned between bearing 42 and a longitudinal end of output yoke 30. Exemplary seal assembly 46 includes a seal carrier 52 configured to be coupled to and rotate with output shaft 28. As shown in FIG. 3, seal carrier 52 defines, for example, at least three annular recesses (e.g., first annular recess 54a, second annular recess 54b, and third annular recess 54c), each configured to receive an annular seal (e.g., first annular seal 56a, second annular seal 56b, and third annular seal 56c, respectively). Seal carrier 52 may be formed of metal or other materials known to those skilled in the art, and the annular seals may be formed of an elastomeric seal material or other materials known to those skilled in the art. As output shaft 28 rotates, seal carrier 52 rotates with the output shaft 28, but the annular seals do not rotate with seal carrier 52. Rather, they remain stationary and provide a seal between seal carrier 52 and inner surface 48 of non-rotating housing 50. As a result, the annular seals rotate with respect to respective annular recesses of seal carrier 52. Because the annular seals abut and slide against the annular recesses of seal carrier 52, the annular seals are lubricated to prevent overheating and/or degradation.

As shown in FIGS. 1, 2A, and 2B, in order to provide lubricant to the annular seals, exemplary output shaft 28 includes a lubricating passage 58 extending along longitudinal axis X. Lubricating passage 58 terminates at an end wall, and one or more radially extending passages 60 extend outwardly from lubricating passage 58 to the external surface of output shaft 28 at a longitudinal position corresponding to seal assembly 46. Lubricant may be supplied to seal assembly 46 via lubricating passage 58 and radially extending passage(s) 60. For example, according to some embodiments, lubricant may be supplied to seal assembly 46 at a pressure of as much as about 300-450 pounds per square inch due the pressure in the fluid being pumped through turbine 38 by pump 34.

Referring to FIGS. 2A, 2B, and 3, exemplary seal carrier 52 defines an outer cylindrical surface defining an annular groove 62 located between first annular recess 54a and second annular recess 54b. In addition, outer cylindrical surface of exemplary seal carrier 52 defines an annular cavity 64 located between second annular recess 54b and a third annular recess 54c. Annular cavity 64 provides an annular lubricating passage between seal carrier 52 and inner surface 48 of non-rotating housing 50.

As shown in FIGS. 2A, 2B, and 3, exemplary seal carrier 52 further defines an inner cylindrical surface defining an inner annular recess 66. Inner annular recess 66 is configured to provide flow communication between radially extending passage(s) 60 of output shaft 28 and seal carrier 52. Seal carrier 52 further defines one or more radially extending passages 68 extending from annular cavity 64, thereby permitting lubricant to flow from passage(s) 60 of output shaft 28, into inner annular recess 66, through passage(s) 68 and into annular cavity 64. Lubricant in annular cavity 64 lubricates and cools second and third annular seals 56b and 56c in second and third annular recesses 54b and 54c, respectively.

Lubricant in annular cavity 64 may be highly pressurized, for example, at a pressure as high as about 300-450 pounds per square inch or more. In contrast, lubricant supplied to bearing 42 may be at about 70 pounds per square inch. Thus, the pressure drop across third annular seal 56c in third annular recess 54c may be about 230 pounds per square inch or more. As a result, lubricant may flow from annular cavity 64, across third annular seal 54c, to bearing 42. In addition, second annular seal 56b received in second annular recess 54b is exposed on one side to the pressure in annular cavity 64. As a result, a significant amount of lubricant may leak past second annular seal 56b to provide lubricant to first annular seal 56a.

As shown in FIGS. 2A and 2B, non-rotating housing 50 may include one or more fluid passages 70 in flow communication with annular groove 62 of seal carrier 52. Fluid passage(s) 70 may provide flow communication between annular groove 62 and a fluid reservoir (not shown) of torque converter 10. As a result of flow communication between annular groove 62 and relief passage(s) 70, the fluid pressure of the lubricant between second annular seal 56b and first annular seal 56a may be reduced substantially, for example, to about 90 pounds per square inch. As a result, leakage of lubricant across first annular seal 56a, from annular groove 62 to the opposite side of first annular seal 56a may be greatly reduced. According to some embodiments, fluid passage(s) 70 provide relatively cleaner lubricant to first and second annular seals 56a and 56b than lubricant supplied to second and third annular seals 56b and 56c by lubricating passage 58 and radially extending passage(s) 60, which may include debris from other portions of torque converter 10.

As shown in FIGS. 2A, 2B, and 3, in addition to seal assembly 46, a lip seal 72 may be provided between output yoke 30 and non-rotating housing 50 at a longitudinal position spaced from first annular seal 56a. According to some embodiments, lip seal 72 may be provided between output shaft 28 and non-rotating housing 50. Lip seal 72 is received in non-rotating housing 50 (e.g., and fixed therein via adhesive) and does not rotate with output shaft 28 or output yoke 30. Exemplary lip seal 72 includes a retainer portion 74 and a seal portion 76, with retainer portion 74 being received in non-rotating housing 50 and seal portion 76 being pressed against output yoke 30 to prevent lubricant that passes first annular seal 56a from leaking from torque converter 10. According to some embodiments, it is intended that a relatively small amount of lubricant pass across first annular seal 56a from annular groove 62 to the opposite side of first annular seal 56a to provide lubricant for seal portion 76 of lip seal 72 to prevent overheating and/or degradation.

The exemplary embodiments shown in FIGS. 1-3 may result in reduced leakage of lubricant past lip seal 72. In particular, the one or more fluid passages 70 provide reduced the pressure between first and second annular seals 56a and 56b. As a result, the pressure drop across first annular seal 56a is significantly reduced, resulting in less leakage of lubricant past first annular seal 56a. As a result, lip seal 72, although still receiving a small amount of lubricant (e.g., an amount sufficient to prevent lip seal 72 from overheating and/or degrading) is able to substantially prevent leakage of lubricant past lip seal 72 and from torque converter 10. In addition, first annular seal 56a may result in a reduced likelihood of damage to lip seal 72 due, for example, to a failure of second annular seal 56b that could result in lubricant under high pressure (e.g., 300-450 psi) spraying directly against lip seal 72. According to some embodiments, a relatively less costly seal material may be used for first annular seal 56a relative to the seal material used for second annular seal 56b as a result of the reduced pressure drop across first annular seal 56a.

Figure 4:
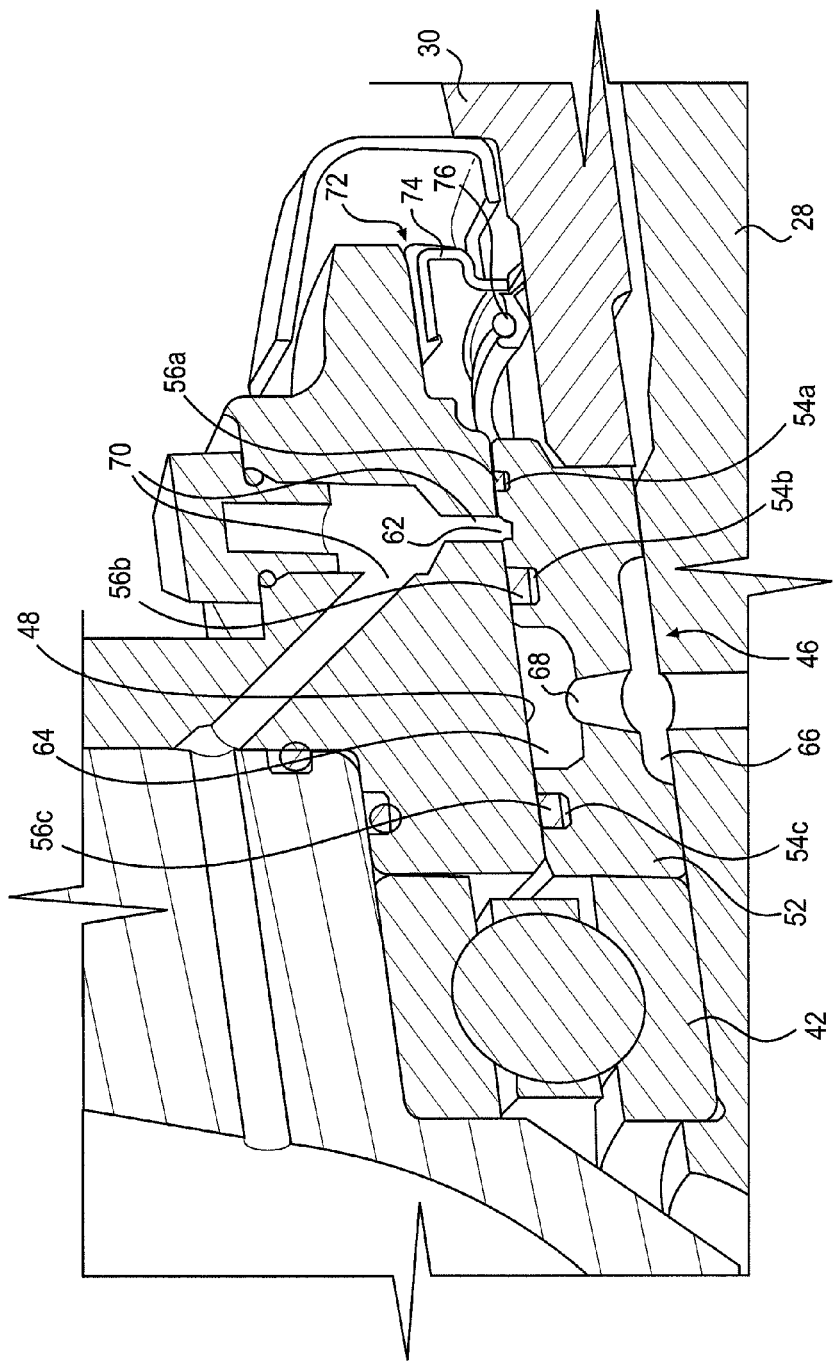
FIG. 4 is a partial section view showing another exemplary embodiment of a seal assembly.

FIG. 4 shows another exemplary embodiment of seal assembly 46. Due to the reduced pressure drop across first annular seal 56a, it may be possible to reduce the size of first annular seal 56a relative to the size of second annular seal 56b as shown in FIG. 4. For example, the cross-sectional area of first annular seal 56a and/or first annular recess 54a may be smaller than the cross-sectional area of second annular seal 56b and/or second annular recess 54b, respectively. For example, the cross-sectional area of first annular seal 56a and/or first annular recess 54a may be, for example, less than about 90% of the cross-sectional area of second annular seal 56b and/or second annular recess 54b, respectively. For example, according to some embodiments, the cross-sectional area of first annular seal 56a and/or first annular recess 54a may be less than about 80%, 70%, 60%, 50%, or 40% of the cross-sectional area of second annular seal 56b and/or second annular recess 54b, respectively. This may result in reducing the cost of seal assembly 46.

INDUSTRIAL APPLICABILITY

Exemplary seal assembly 46 disclosed herein may be used, for example, to reduce or prevent leakage of fluid from a torque converter at the interface between the housing and the output shaft of the torque converter. For example, some conventional torque converters may include a seal between the housing and the output shaft, but such seals may result in more fluid leaking from the torque converter than desired. The exemplary seal assembly disclosed herein may mitigate or overcome this drawback, Exemplary seal assembly 46 disclosed herein includes at least three annular seals. As a result, annular cavity 64 between two of the at least three annular seals may be provided with lubricant at a first pressure, and annular groove 62 between one of the two annular seals and a third of the at least three annular seals may be provided with lubricant at a second pressure that is lower than the first pressure. The lower second pressure is provided by one or more fluid passages 70 in non-rotating housing 50, which serve(s) to provide a lubricant having a relatively reduced pressure to annular groove 62. As a result, the third annular seal allows less lubricant to flow to a space between the third annular seal and lip seal 72, which serves to reduce the amount of (or prevent) lubricant from leaking from torque converter 10. Further, a relatively less costly seal material may be used for first annular seal 56*a* relative to the seal material used for second annular seal 56*b* as a result of the reduced pressure drop across first annular seal 56*a*. In addition, due to the reduced pressure drop across first annular seal 56*a*, it may be possible to reduce the size of first annular seal 56*a* relative to the size of second annular seal 56*b*. As a result, the cost of seal assembly 46 may be reduced.

It will be apparent to those skilled in the art that various modifications and variations can be made to the exemplary disclosed systems, methods, and machine. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A seal assembly comprising:
a seal carrier configured to be coupled to and rotate with a shaft, the seal carrier defining at least three annular recesses configured to receive annular seals; and
at least three annular seals configured to provide a seal between the seal carrier and a non-rotating housing defining an inner surface having a circular cross-section,
wherein one of the at least three seals is received in each of the at least three annular recesses, and
wherein one of the at least three seals has a smaller cross-sectional area than a cross-sectional area of at least one of the other seals.

2. The seal assembly of claim 1, wherein the seal carrier defines an annular groove between two of the at least three annular recesses, the annular groove being configured to provide flow communication between the seal carrier and a fluid passage defined by the non-rotating housing.

3. The seal assembly of claim 2, wherein the seal carrier defines an annular cavity between two of the three annular recesses, the annular cavity being configured to provide an annular lubricating passage between the seal carrier and the inner surface of the non-rotating housing.

4. The seal assembly of claim 3, wherein the annular groove is located between a first and a second of the at least three annular recess, and the annular cavity is located between the second annular recess and a third annular recess of the at least three annular recesses.

5. The seal assembly of claim 1, wherein the seal carrier defines an annular cavity between two of the at least three annular recesses, the annular cavity being configured to provide an annular lubricating passage between the seal carrier and the inner surface of the non-rotating housing.

6. The seal assembly of claim 2, wherein the seal carrier defines an inner surface, and wherein the inner surface of the seal carrier defines an inner annular recess configured to provide flow communication between an inner passage of the shaft and the seal carrier.

7. The seal assembly of claim 6, wherein the seal carrier defines a radial passage providing flow communication between the inner annular recess and the annular cavity.

8. A torque converter comprising:
a housing configured to be rotated by a prime mover;
an impeller coupled to the housing and configured to rotate with the housing and pump fluid;
a turbine configured to rotate as a result of fluid pumped by the impeller;
a stator associated with the impeller and the turbine, the stator being configured to direct fluid flow between the turbine and the impeller;
an output shaft coupled to the turbine and configured to be rotated by the turbine;
a non-rotating housing coupled to the stator and configured to receive the output shaft, the non-rotating housing defining an inner surface having a circular cross-section; and
a seal assembly coupled to the output shaft, the seal assembly including:
a seal carrier coupled to and configured to rotate with the output shaft, the seal carrier defining at least first and second annular recesses configured to receive annular seals, and an annular groove between the first and second annular recesses, and
a first annular seal and a second annular seal configured to provide a seal between the seal carrier and the non-rotating housing, the first and second annular seals being received respectively in the first and second annular recesses,
wherein the non-rotating housing defines a fluid passage configured to provide flow communication between the annular groove of the seal carrier and a location exterior with respect to the non-rotating housing, such that the first annular seal is exposed to a lower fluid pressure than the second annular seal, and
wherein the first annular seal has a smaller cross-sectional area than a cross-sectional area of the second annular seal.

9. The torque converter of claim 8, wherein the seal carrier defines a third annular recess, and the seal assembly further includes a third seal received in the third annular recess.

10. The torque converter of claim 9, wherein the seal carrier defines an annular cavity between the second annular recess and the third annular recess, the annular cavity being configured to provide an annular lubricating passage between the seal carrier and the inner surface of the non-rotating housing.

11. The torque converter of claim 10, wherein the annular groove is located between the first annular recess and the second annular recess, and the annular cavity is located between the second annular recess and the third annular recess.

12. The torque converter of claim 10, wherein the seal carrier defines an inner surface, and wherein the inner surface of the seal carrier defines an inner annular recess configured to provide flow communication between an inner passage of the output shaft and the seal carrier.

13. The torque converter of claim 12, wherein the seal carrier defines a radial passage providing flow communication between the inner annular recess and the annular cavity.

14. The torque converter of claim 12, wherein the seal assembly is configured such that fluid pressure in the annular cavity has a first pressure and fluid pressure in the annular groove has a second pressure, and wherein the first pressure is higher than the second pressure.

15. The torque converter of claim 8, further including:
- an output yoke coupled to the output shaft and configured to couple the output shaft of the torque converter to a transmission input shaft; and
- a lip seal received by the non-rotating housing.

16. The torque converter of claim 15, further including a bearing associated with and rotatably supporting the output shaft, wherein the seal assembly is between the bearing and the lip seal.

17. The torque converter of claim 15, wherein the seal carrier is between the bearing and the output yoke.

18. The torque converter of claim 15, wherein the lip seal provides a fluid seal between the non-rotating housing and the output yoke.

19. A method for providing reduced fluid pressure between a seal assembly and a lip seal, the seal assembly being coupled to a shaft configured to rotate within a non-rotating housing, the method comprising:
- providing a seal assembly including a seal carrier defining at least three annular recesses having at least three annular seals received respectively therein, the seal carrier being coupled to and rotating with the shaft, and the annular seals providing a seal between the seal carrier and the non-rotating housing;
- supplying fluid to the seal assembly at a first pressure to provide lubrication between the annular seals and the seal carrier; and
- providing a fluid passage in the non-rotating housing in flow communication with an annular groove between two of the at least three annular seals, such that fluid pressure between the two annular seals is at a second pressure that is less than the first pressure,
- wherein the lip seal is coupled to the non-rotating housing at a position opposite at least one other annular seal with respect to the two annular seals, and
- wherein one of the two annular seals has a smaller cross-sectional area than a cross-sectional area of another of the two annular seals.

20. The method of claim 19, wherein the two annular seals are first and second annular seals, and the at least one other annular seal is a third annular seal, and wherein supplying fluid to the seal assembly at a first pressure includes supplying fluid to the second and third annular seals at the first fluid pressure.

* * * * *